(12) United States Patent
Choi

(10) Patent No.: US 6,368,757 B1
(45) Date of Patent: Apr. 9, 2002

(54) CHOLESTERIC LIQUID CRYSTAL COLOR FILTER PLATE AND METHOD FOR MANUFACTURING THE SAME

(75) Inventor: Suk-won Choi, AnYang-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/621,622

(22) Filed: Jul. 21, 2000

(30) Foreign Application Priority Data

Jul. 21, 1999 (KR) ............................................. 99-29523

(51) Int. Cl.$^7$ ............................ G02B 5/20; G02F 1/1335
(52) U.S. Cl. .............................................. 430/7; 430/20
(58) Field of Search ........................................ 430/7, 20

(56) References Cited

U.S. PATENT DOCUMENTS 6,025,899 A * 2/2000 Fukunaga et al. ........... 349/115
6,177,216 B1 * 1/2001 Broer et al. .................... 430/7

FOREIGN PATENT DOCUMENTS

JP          11-044890         2/1999
JP          11-153789 A   *  6/1999

* cited by examiner

*Primary Examiner*—John A. McPherson
(74) *Attorney, Agent, or Firm*—Birch, Stewart, Kolasch & Birch, LLP

(57) ABSTRACT

A cholesteric liquid crystal color filter plate which includes a substrate, a first light filter region on the substrate wherein the first light filter region is formed of a cholesteric liquid crystal mixture which is permeable to a red wavelength zone by reflecting blue and green wavelength zones, a second light filter region on the substrate wherein the second light filter region formed of a cholesteric liquid crystal mixture is permeable to the blue wavelength zone by reflecting the green and red wavelength zones, and a third light filter region on the substrate wherein the third light filter region formed of a cholesteric liquid crystal-dye mixture is permeable to the green wavelength zone. The cholesteric liquid crystal-dye mixture is manufactured by mixing a cholesteric liquid crystal reflecting one of the red wavelength zone or the blue wavelength zone, with a dye absorbing the remaining wavelength zone which is not selected by the cholesteric liquid crystal.

21 Claims, 9 Drawing Sheets

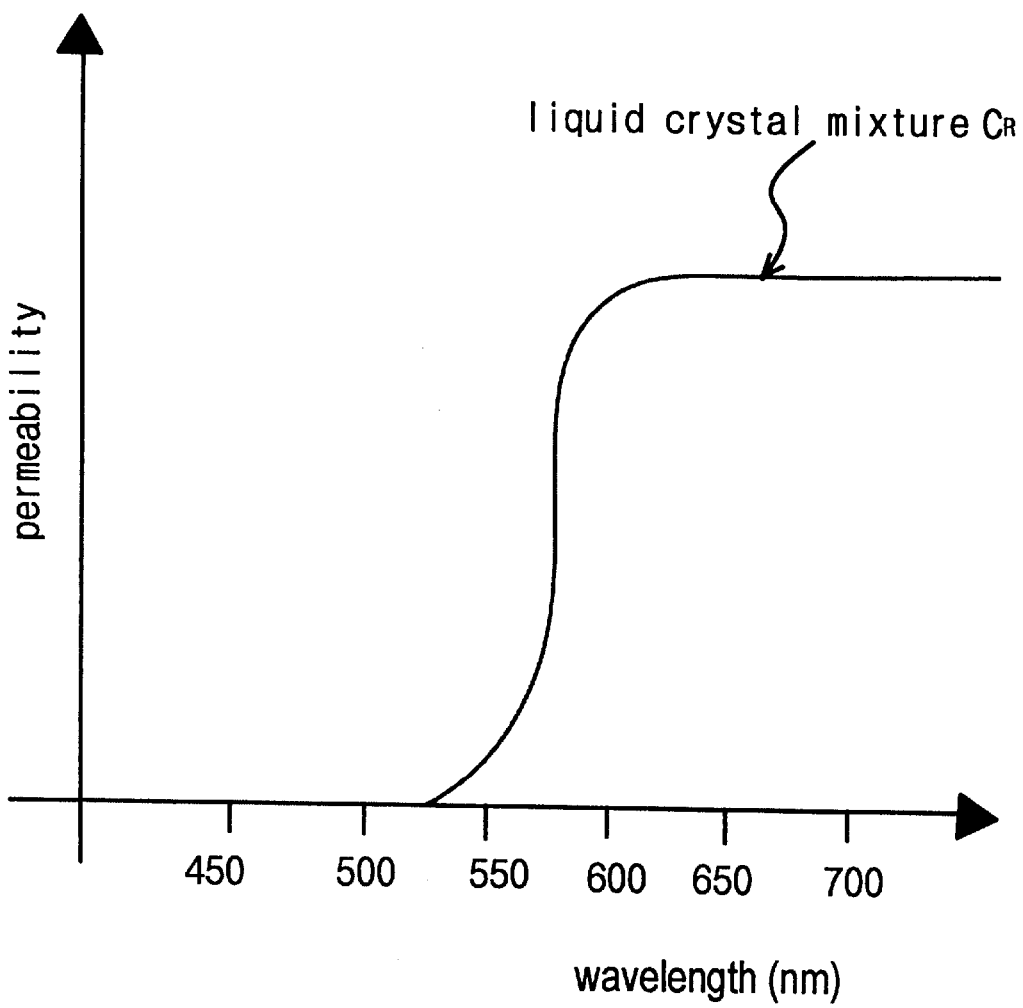

CHOLESTERIC LIQUID CRYSTAL COLOR FILTER PLATE AND METHOD FOR MANUFACTURING THE SAME

BACKGROUND OF THE INVENTION

1. Field of Invention

The present invention relates to a cholesteric liquid crystal color filter plate which is formed of cholesteric liquid crystal.

2. Discussion of Related Art

When a cholesteric liquid crystal (hereinafter abbreviated CLC) is irradiated with a light ray consisting of various wavelengths, such as white light, most of the optically active light is transmitted through the liquid crystal with the exception of light having a wavelength which approximates the pitch of the liquid crystal. Namely, a CLC will selectively reflect light having a wavelength region equivalent to the intrinsic pitch of cholesteric phase. For this reason, a CLC shows a color within the visible light region owing to its pitch. Thus, by using such characteristics, a CLC can be used for a color filter or a color polarizer.

FIG. 1 shows the permeability of cholesteric liquid crystals having homogeneous pitches reflecting blue, green, and red lights of a visible light ray, respectively, in accordance with their wavelengths. Referring to FIG. 1, "liquid crystal I" designates a CLC selectively reflecting blue light in the range of approximately 430–500 nm, "liquid crystal II" selectively reflects a green light in the range of approximately 520–570 nm, and "liquid crystal III" selectively reflects red light in the range of approximately 580–660 nm.

CLCs may be divided into two categories, thermochromic and monochromic, in accordance with the possibility of controlling the pitch depending on fabrication temperatures.

A thermochromic CLC has a pitch which can be controlled according to its hardening temperature, thus enabling the selection of a specific light wavelength region for reflection. On the other hand, a monochromic CLC has a single characteristic pitch and only reflects a single preselected light wavelength.

FIG. 2A to FIG. 2C show schematic cross-sectional views of fabricating a color filter using thermochromic CLCs for explaining one type of the related art.

Referring to FIG. 2A, a top of a substrate 200 is coated with a first thermochromic CLC layer 21. Then, a predetermined portion of the first thermochromic CLC layer 21 is hardened by selective exposure through a photomask M at a first process temperature. In this case, the exposed portion of the first thermochromic CLC layer 21 is hardened to have a first pitch under the first temperature, thereby becoming a first light wavelength region, for example, a region R enabling the reflection of red light only.

Referring to FIG. 2B, a green region G is formed at the other portion of the first thermochromic CLC layer 21 by the same method used for forming the red region R. Namely, the remaining portion of the first thermochromic CLC layer 21 is hardened by another selective exposure through the photomask M at a second process temperature. In this case, the exposed portion of the first thermochromic CLC layer 21 is hardened to have a second pitch under the second temperature, becoming a second light wavelength region, for example, a green region G enabled to reflect only green light wavelengths.

Referring to FIG. 2C, a second thermochromic CLC layer 22 in which a blue region B and a red region R are arranged is formed on the first thermochromic CLC layer 21 where the red region R and green region G have been arranged in order. The red and blue regions R and B are formed by the above mentioned method.

In this case, each of the regions in the second thermochromic CLC layer 22 is formed not to overlap with the same kind of region of the first thermochromic CLC layer 21. A ray permeating through the area where the red and green regions R and G overlap one another, of which red and green lights are reflected thereon and a blue light passes through, realizes a blue color. By the same principle, as shown in FIG. 2C, green light and red light pass through, realizing a green color and a red color, respectively.

FIGS. 3A and 3B show schematic cross-sectional views of fabricating a color filter using monochromic CLCs according to a second related art.

A monochromic CLC has a characteristic pitch of the cholesteric phase, and a color filter is fabricated by the same process as the conventional fabrication of color filters.

Referring to FIG. 3A, a top surface of a substrate 300 is coated with a monochromic CLC layer which reflects a first light wavelength region such as a red light. The monochromic CLC layer is selectively exposed and developed, forming a red region R. Then, a green region G is formed by forming another monochromic CLC layer reflecting a second wavelength zone such as a green light, followed by selective exposure and development. A blue region B is also formed by the same method.

Thus, the red, blue and green regions R, B, and G are located in a first layer.

Referring to FIG. 3B, red blue and green regions R, B, and G of a second layer are formed on the red blue and green regions R, B, and G located at the first layer by carrying out the same process mentioned in the above description. In this case, each of the regions in the second layer is formed not to overlap with the same kind region of the first layer.

As a result, a color filter permeable only to a predetermined color is fabricated.

A drawback of the above described related art technology is that the formation of the respective regions by using a thermochromic CLC having a predetermined pitch requires the control of exposure and temperature whenever the respective regions are to be formed. As a result, this technology requires more process equipment and is time consuming.

Disadvantages from the related art technologies arise from the stacking of the multiple layers required to manufacture a filter. Misalignment of the liquid crystals can cause light scattering at the interface between the layers. The stacking of layers also results in a thick color filter having a tendency to degrade. A multilayered filter requires additional manufacturing steps result in higher manufacturing costs and an increased reject rate.

SUMMARY OF THE INVENTION

The invention is directed to fabricating a semiconductor device that substantially eliminates one or more of the problems due to the limitations and disadvantages of the related art.

A cholesteric liquid crystal color filter plate is formed from a single CLC layer by using a mixture of liquid crystal and dye. The filter plate is manufactured by mixing a cholesteric liquid crystal reflecting one specific color wavelength zone with a dye absorbing another specific light wavelength zone. The filter plate can also be made by using a liquid crystal mixture reflecting at least two continuous light wavelength zones.

The filter plate includes, in part, a substrate. On the substrate is formed a first light filter region formed of a cholesteric liquid crystal mixture is permeable by a red wavelength zone by reflecting blue and green wavelength zones. A second light filter region on the substrate is formed of a cholesteric liquid crystal mixture permeable to the blue wavelength zone by reflecting the green and red wavelength zones. A third light filter region on the substrate is formed of a cholesteric liquid crystal-dye mixture permeable to the green wavelength zone. The cholesteric liquid crystal-dye mixture of the third filter region is manufactured by mixing a cholesteric liquid crystal reflecting one of the red wavelength zone and the blue wavelength zone with a dye absorbing the remaining wavelength zone which is not selected by the cholesteric liquid crystal. The first, second and third light filter regions lie continuously on the substrate and form a single layer.

In another embodiment, the filter can include a substrate, and a first to third light filter regions on the substrate. The first to third light filter regions are permeable to different light wavelength zones, i.e., red, green and blue, respectively. The first to third light filter regions are formed by mixing a cholesteric liquid crystal selectively reflecting one of red, green, and blue wavelength zones with a dye absorbing one of the remaining wavelength zones not reflected by the cholesteric liquid crystal. As a result, each cholesteric liquid crystal-dye mixture has the characteristic of being permeable to the remaining wavelength zone which is selected by neither the cholesteric liquid crystal nor the dye. The first, second and third light filter regions lie continuously on the substrate and form a single layer.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings are included to provide a further understanding of the invention. The drawings illustrate embodiments of the invention and together with the description serve to explain the principles of the embodiments of the invention.

FIG. 4 shows a graph of permeability vs. wavelength of light incident on a liquid crystal mixture permeable to red light;

DETAILED DESCRIPTION OF THE PREFERRED EMBODIMENTS

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Reference will now be made in detail to the preferred embodiments of the present invention, examples of which are illustrated in the accompanying drawings.

The present invention, in part, provides a cholesteric liquid crystal color filter including a single layer by using a liquid crystal-dye mixture manufactured by mixing a cholesteric liquid crystal reflecting one wavelength zone with a dye absorbing a specific light wavelength zone or by using a liquid crystal mixture reflecting at least two continuous light wavelength zones instead of using a CLC reflecting a specific light wavelength zone. The CLC needs at least two pitches corresponding to specific light wavelength zones to be reflected. In contrast, the related art utilizes stacked CLC layers having different pitches to reflect at least two light wavelength zones.

However, the present invention forms a color filter having a single layered structure by using a multi-pitched CLC mixture having at least two pitches to reflect at least two light wavelength zones.

Figure 1:
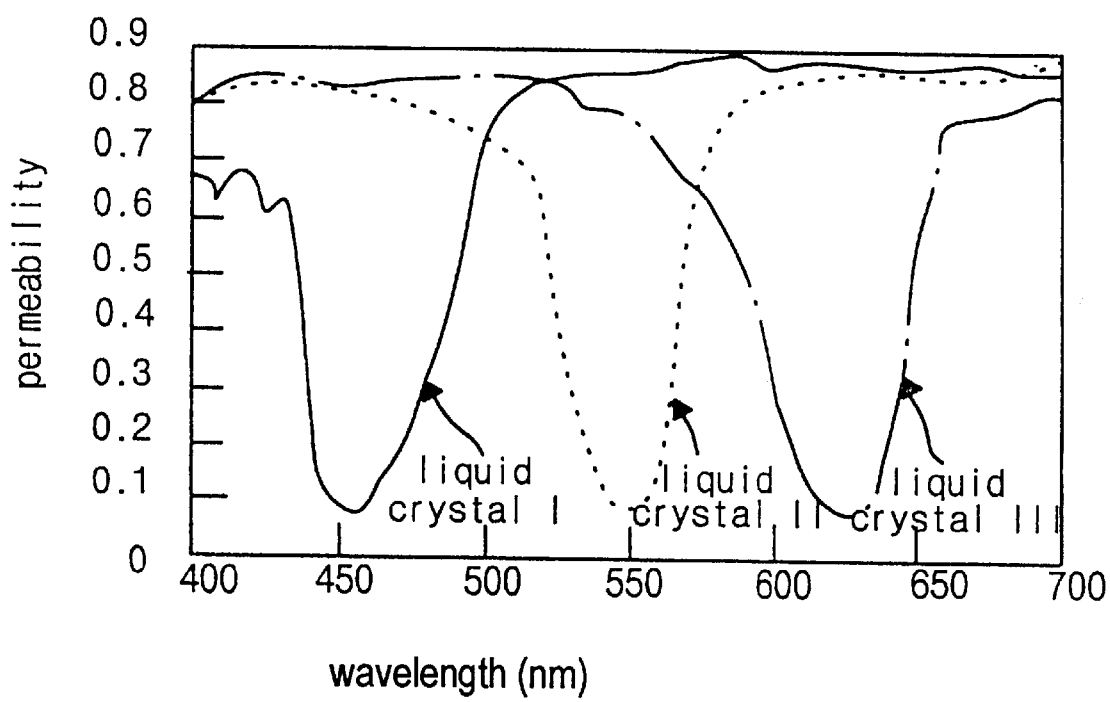
FIG. 1 shows permeability of liquid crystals having homogeneous pitches reflecting blue, green, and red wavelengths of visible light.
Figure 2A:
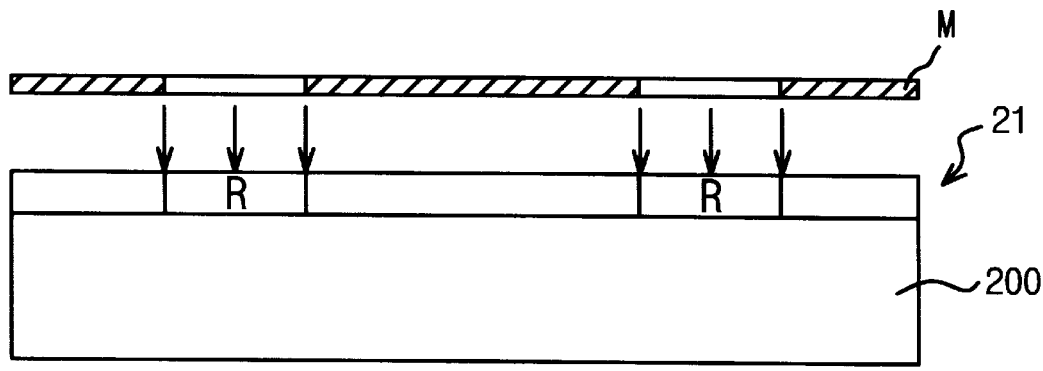
FIGS. 2A to 2C show schematic cross-sectional views for fabricating a related art color filter using thermochromic CLCs.
Figure 2B:
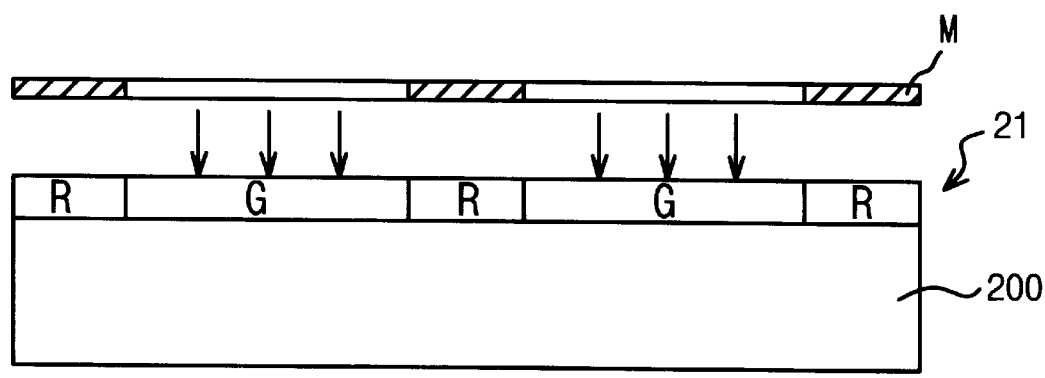
Figure 2C:
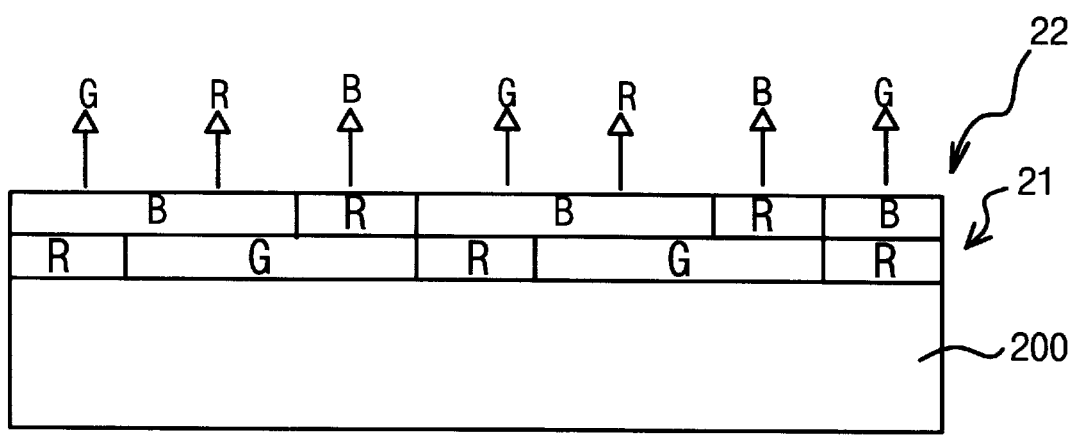
Figure 3A:
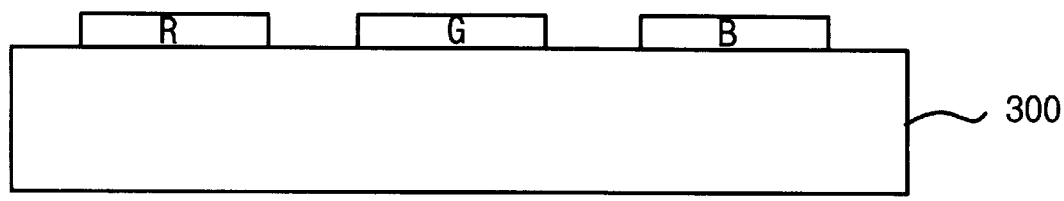
FIG. 3A and FIG. 3B show schematic cross-sectional views for fabricating a related art color filter using monochromic CLCs.
Figure 3B:
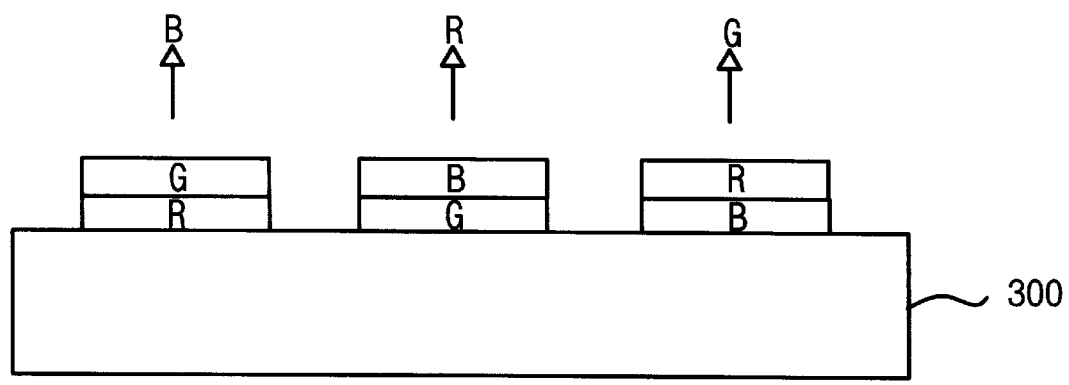
Figure 5:
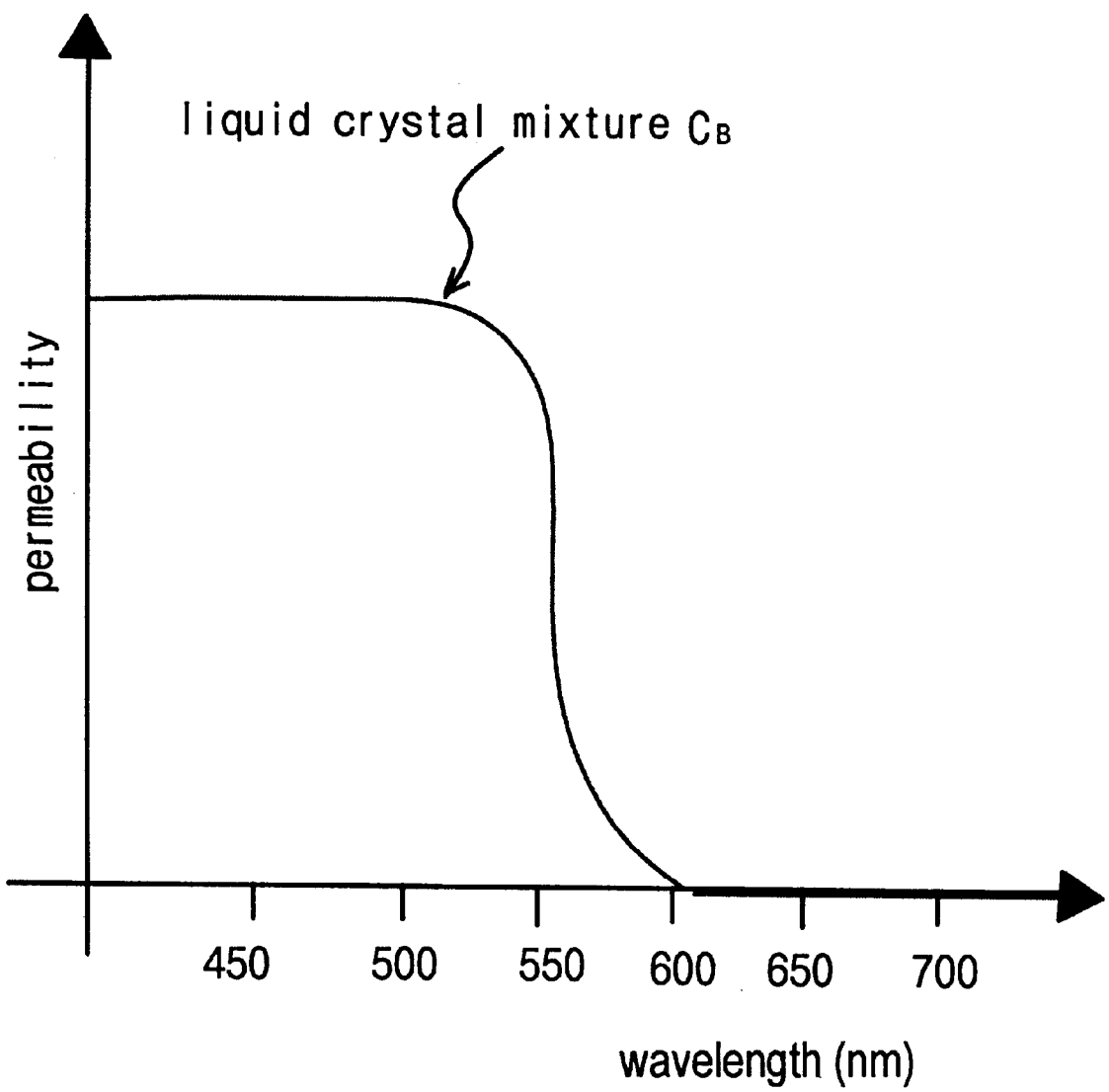
FIG. 5 shows a graph of permeability vs. wavelength of light incident on a liquid crystal mixture permeable to blue light.

FIG. 4 shows a graph of permeability vs. wavelength of a ray incident on a liquid crystal mixture CR permeable to red light, and FIG. 5 shows a graph of permeability vs. wavelength of a ray incident on a liquid crystal mixture CB permeable to blue light.

Referring to FIG. 4, a liquid crystal mixture CR, of which the pitches are adjusted to reflect a blue light wavelength zone and an adjacent green light wavelength zone continuously, is permeable to red light having wavelengths of approximately 580 nm or greater.

Referring to FIG. 5, a liquid crystal mixture CB, of which the pitches are adjusted to reflect a green light wavelength zone and an adjacent red light wavelength zone continuously, is permeable to a blue light having wavelengths of approximately 500 nm or less.

A multi-pitched CLC mixture having at least two pitches is known to the public.

An example of manufacturing the multi-pitched CLC mixture of which pitches are changed continuously is explained in the following description, which is also disclosed in EKISHO Vol. 2, No. 2, 1998, pp. 33.

A complex is fabricated by using a chiral liquid crystal molecule A having two UV functional groups and another liquid crystal molecule B having one UV functional group. The complex is mixed with proper amount of photo-polymerization initiator and coloring matter, i.e., dye. Then the complex is treated to induce proper alignment.

Then, the complex is distributed on a substrate and photo-polymerization is carried out by exposure of the liquid crystal surface facing away from the substrate to UV irradiation. In this case, the surface irradiated with UV rays initiates a gradual polymerization by the proper selection of conditions such as polymerization temperature, UV intensity and the like.

The complex is formulated so that bifunctional liquid crystal molecules A polymerize earlier than the monofunctional liquid crystal molecules B.

During polymerization, the density of A at the surface where the light is incident becomes high, while the substance B, which does not react, diffuses into the nonirradiated side. Finally, after polymerization is complete, a layer is formed where the density of A at a portion near the surface irradiated with the light is high, while the density of B is high at the opposite, nonirradiated, side.

The pitch of the cholesteric phase decreases as the density of the substance A having a chiral part becomes higher. That is, the pitch becomes longer as the density of the other substance B becomes higher. Thus, the pitch is short at the liquid crystal surface where the light is incident, while the pitch at the nonirradiated side of the liquid crystal layer is long. Also, the interval between the pitches changes continuously.

Thus, a single-layered multi-pitched CLC layer where the pitches continuously vary is fabricated.

On the other hand, a substance layer permeable to a specific light wavelength is manufactured by using a dye, which is fabricated by mixing a CLC having a single pitch reflecting a specific light wavelength zone with a dye absorbing a predetermined light wavelength zone.

Figure 6:
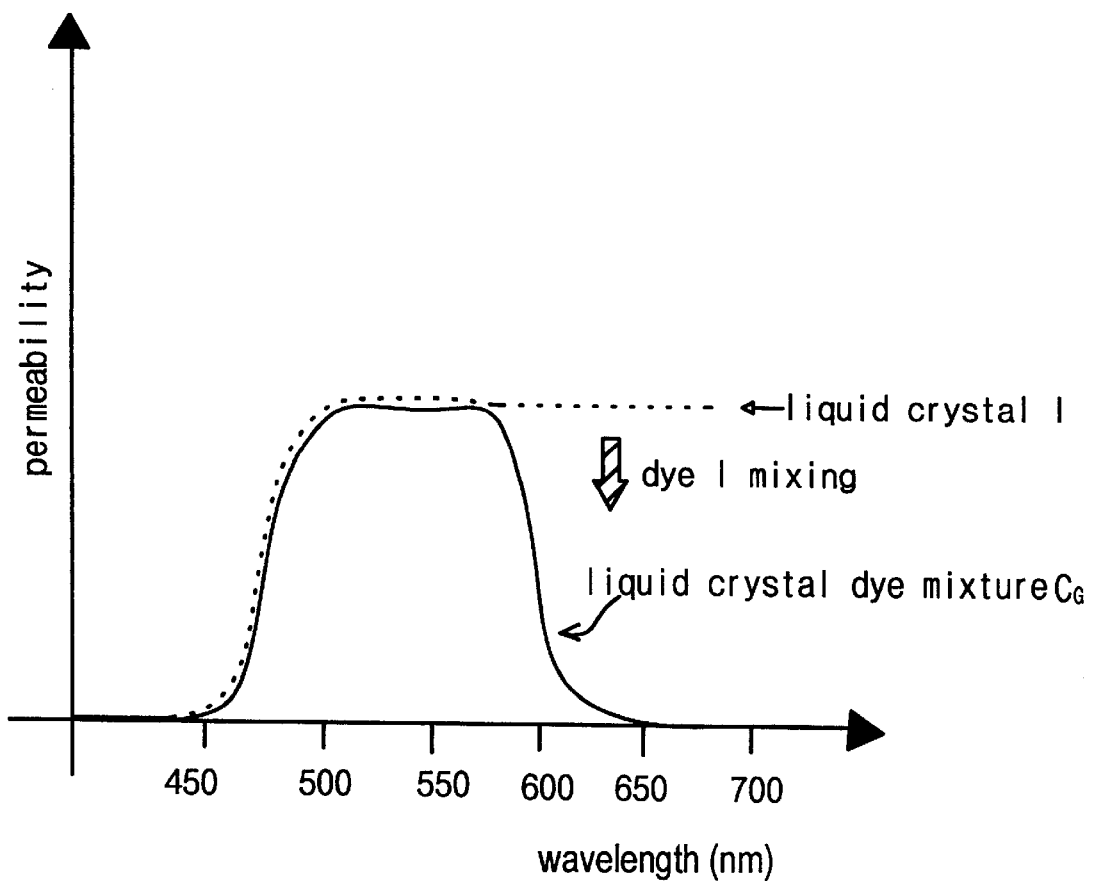
FIG. 6 shows a graph of permeability vs. wavelength of light incident on a first liquid crystal-dye mixture permeable to a green light.

FIG. 6 shows a graph of permeability vs. wavelength of a light incident on a first liquid crystal-dye mixture permeable to a green light in a range of approximately 460–600 nm.

Referring to FIG. 6, a first liquid crystal-dye mixture CG permeable to green light may be formed by mixing a liquid crystal I of a single pitch reflecting a blue light selectively with a dye I absorbing red light.

Similarly, other embodiments may be introduced to form liquid crystal-dye mixtures.

Figure 7:
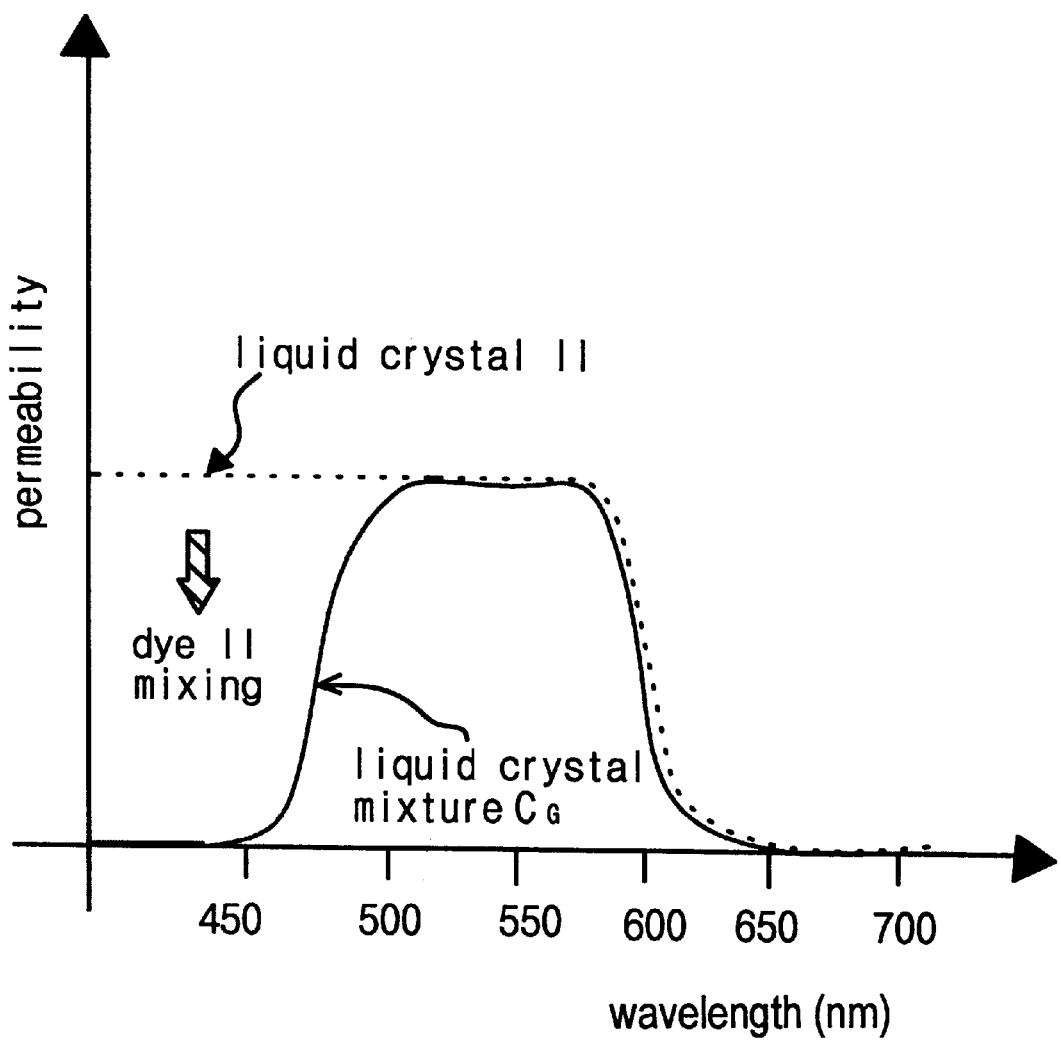
FIG. 7 shows a graph of permeability vs. wavelength of light incident on a second liquid crystal-dye mixture permeable to a green light.

FIG. 7 shows a graph of permeability vs. wavelength of a ray incident on a second liquid crystal-dye mixture permeable to green light.

Referring to FIG. 7, a second liquid crystal-dye mixture CG permeable to green light may be formed by mixing a liquid crystal II of a single pitch reflecting a red light selectively with a dye II absorbing blue light.

By the same principle, it is possible to manufacture a liquid crystal-dye mixture permeable to blue light or another liquid crystal-dye mixture permeable to red light.

It is possible to manufacture single layered liquid crystals permeable to specific light wavelength zones respectively, thereby enabling the fabrication of a liquid crystal color filter plate using such single-layered liquid crystals.

Figure 8:
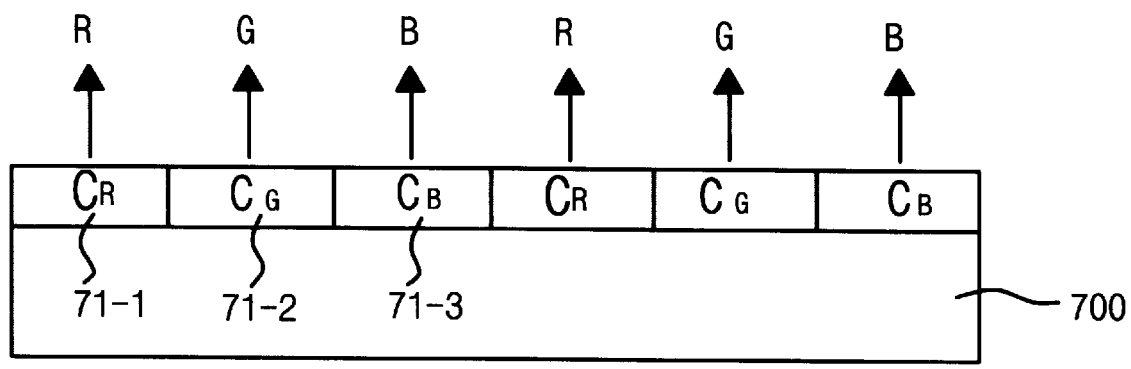
FIG. 8 shows a schematic cross-sectional view of a cholesteric liquid crystal color filter plate according to an embodiment of the present invention.

FIG. 8 shows a schematic cross-sectional view of a cholesteric liquid crystal color filter plate according to an embodiment of the present invention.

Referring to FIG. 8, a plurality of color filter regions, which enables the generation of predetermined colors by reflecting predetermined light wavelength zones by being permeable to predetermined light wavelength zones, respectively, are arranged on a substrate 700.

On the substrate 700 are formed are a first color filter region 71-1 which is made from a liquid crystal mixture CR permeable to red light R, a second color filter region 71-2 which is made from a liquid crystal-dye mixture CG permeable to green light G, and a third color filter region 71-3 which is made from a liquid crystal mixture CB permeable to blue light B. The respective color filter regions 71-1, 71-2, and 71-3 form a single layer.

In this case, the first color filter region 71-1 may be formed by using a liquid crystal-dye mixture permeable to red light, a second color filter region 71-2 may be formed by using a liquid crystal-dye mixture permeable to green light, and a third color filter region 71-3 may be formed by using another liquid crystal-dye mixture permeable to blue light as well.

The color filter regions on the substrate are formed by the same method of fabricating a general color filter region which includes the steps of coating a liquid crystal layer, carrying out exposure and development and the like.

Accordingly, the present invention enables a simplified fabrication process of a color filter by forming a single-layered color filter using liquid crystals permeable to specific light wavelength zones respectively.

Also, the present invention enables a reduced consumption of liquid crystals.

Moreover, the present invention enables the prevention of light leakage by forming a color filter of liquid crystals having continuous pitches, thereby improving the purity of the transmitted ray.

It will be apparent to those skilled in the art that various modifications and variations can be made in a cholesteric liquid crystal color filter plate of the present invention without departing from the spirit or scope of the invention. Thus, it is intended that the present invention cover the modifications and variations of this invention provided they come within the scope of the appended claims and equivalents.

What is claimed is:

1. A cholesteric liquid crystal color filter plate, comprising:
   a substrate; and
   a single color filter layer formed on the substrate, the color filter layer including,
      a first light filter region formed of a cholesteric liquid crystal mixture permeable to a red wavelength zone by reflecting blue and green wavelength zones,
      a second light filter region formed of a cholesteric liquid crystal mixture permeable to the blue wavelength zone by reflecting the green and the red wavelength and
      a third light filter region formed of a cholesteric liquid crystal-dye mixture permeable to the green wavelength zone.

2. The cholesteric liquid crystal color filter plate according to claim 1, wherein the cholesteric liquid crystal-dye mixture comprises a cholesteric liquid crystal which reflects one of the red wavelength zone or the blue wavelength zone, and a dye absorbing the red wavelength zone or the blue wavelength zone which is not selected by the cholesteric liquid crystal.

3. The cholesteric liquid crystal color filter plate according to claim 1, wherein the red wavelength zone is in the range of approximately 580–660 nm, the blue wavelength zone is in the range of approximately 430–500 nm, and the green wavelength zone is in the range of approximately 520–570 nm.

4. The cholesteric liquid crystal color filter plate according to claim 1, wherein the first light filter region is formed of a cholesteric liquid crystal mixture having at least 2 pitches corresponding to the blue and green wavelength zones, the second light filter region is formed of a cholesteric liquid crystal mixture having at least 2 pitches corresponding to the red and green wavelength zones, and the third light filter region comprises a cholesteric liquid crystal-dye mixture permeable to the green wavelength zone.

5. The cholesteric liquid crystal color filter plate according to claim 4, wherein the mixture having at least 2 pitches has an interval between the two pitches which changes continuously.

6. The cholesteric liquid crystal color filter plate according to claim 1, wherein the third light filter region is formed from a cholesteric liquid crystal having a single pitch.

7. A cholesteric liquid crystal color filter plate, comprising:
   a substrate;
   a first light filter region on the substrate;
   a second light filter region on the substrate; and
   a third light filter region on the substrate, wherein the first to third light filter regions are permeable to different light wavelength zones respectively, and the first to third light filter regions comprise a cholesteric liquid crystal selectively reflecting one of red, green, and blue wavelength zones and a dye absorbing one of the wavelength zones not reflected by the cholesteric liquid crystal.

8. The cholesteric liquid crystal color filter plate according to claim 7, wherein the red wavelength zone is in the range of approximately 580–660 nm, the blue wavelength zone is in the range of approximately 430–500 nm, and the green wavelength zone is in the range of approximately 520–570 nm.

9. The cholesteric liquid crystal color filter plate according to claim 7, wherein the first, second and third light filter regions each comprise a cholesteric liquid crystal having a single pitch.

10. The cholesteric liquid crystal color filter plate according to claim 7, wherein the first light filter region on the substrate, the second light filter region on the substrate and the third light filter region on the substrate form a single layer.

11. A method for manufacturing a cholesteric liquid crystal color filter plate containing at least one cholesteric liquid crystal mixture having at least 2 pitches, the method comprising:
   forming a complex by mixing chiral liquid crystal molecules having 2 UV functional groups with liquid crystal molecules having 1 UV functional group;
   aligning the complex; and
   irradiating a surface of the complex with UV radiation so that the complex polymerizes so that a concentration of the chiral liquid crystal molecules having 2 functional groups is greatest nearer the irradiated surface, and a concentration of the liquid crystal molecules having 1 functional group is greatest at a side away from the irradiated surface.

12. The method according to claim 11, wherein in the step of irradiating, the complex polymerizes so that the pitches continuously reflect 2 adjacent wavelength zones.

13. The method according to claim 12, wherein in the step of irradiating, the complex polymerizes so that the 2 adjacent wavelength zones are red and green or green and blue.

14. The cholesteric liquid crystal color filter plate according to claim 11, wherein in the step of forming the complex, the complex contains a dye.

15. The method according to claim 11, wherein in the step of forming the complex, the complex contains a photopolymerization initiator.

16. The method according to claim 11, wherein in the step of irradiating, the pitch of the cholesteric liquid crystal decreases as the density of chiral liquid crystal molecules having 2 UV functional groups increases, and the pitch of the cholesteric liquid crystal increases as the density of the liquid crystal molecules having 1 UV functional group increases.

17. The method according to claim 11, further comprising:
   forming at least one cholesteric liquid crystal mixture by mixing a monochromic cholesteric liquid crystal and a dye.

18. The method according to claim 17, wherein mixing the monochromic cholesteric liquid crytstal and dye forms a mixture permeable to a green wavelength zone.

19. A method for manufacturing a cholesteric liquid crystal color filter plate comprising a substrate, a first light filter region on the substrate, a second light filter region on the substrate and a third light filter region on the substrate, the method comprising:
   forming the first filter region by mixing a cholesteric liquid crystal selectively reflecting one of the green or blue wavelength zones with a dye absorbing the one of the green or blue wavelength zones not reflected by the cholesteric liquid crystal;
   forming the second filter region by mixing a cholesteric liquid crystal selectively reflecting one of the red or blue wavelength zones with a dye absorbing the one of the red or blue wavelength zones not reflected by the cholesteric liquid crystal; and
   forming the third filter region by mixing a cholesteric liquid crystal selectively reflecting one of the red or green wavelength zones with a dye absorbing the one of the red or green zones not reflected by the cholesteric liquid crystal.

20. The method according to claim 19, further comprising forming the first filter region, second filter region and third filter region as a single layer on the substrate.

21. A cholesteric liquid crystal color filter plate, comprising:
   a substrate; and
   a single color filter layer formed on the substrate, the color filter layer including a light filter region having at least 2 pitches, and an interval between the two pitches changes continuously.

* * * * *